Figure 1:
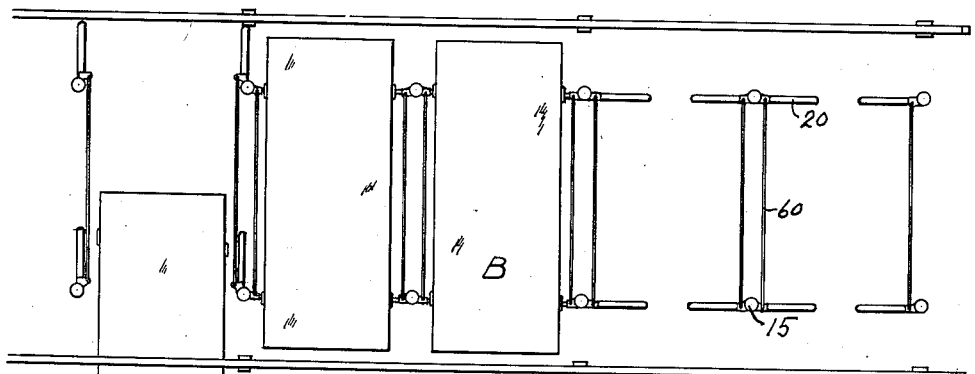

Feb. 2, 1937.   B. F. FITCH   2,069,235
APPARATUS FOR SUPPORTING DEMOUNTABLE BODIES
Filed May 24, 1934   2 Sheets-Sheet 1

Inventor
Benjamin F. Fitch
By Baler, Golrick Hears
Attorneys

Feb. 2, 1937. B. F. FITCH 2,069,235
APPARATUS FOR SUPPORTING DEMOUNTABLE BODIES
Filed May 24, 1934 2 Sheets-Sheet 2
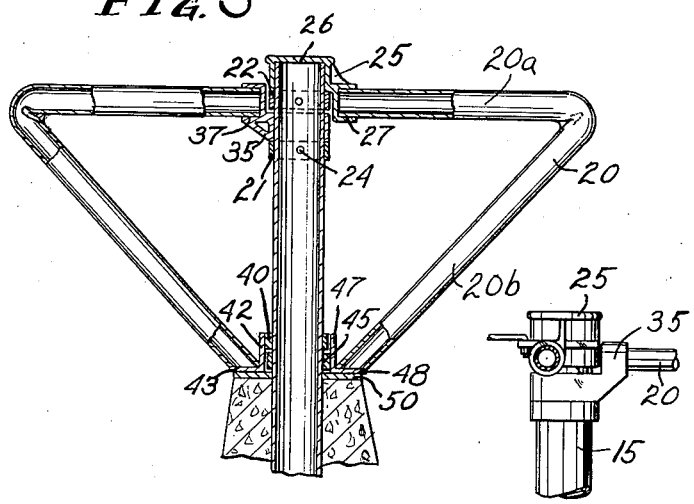
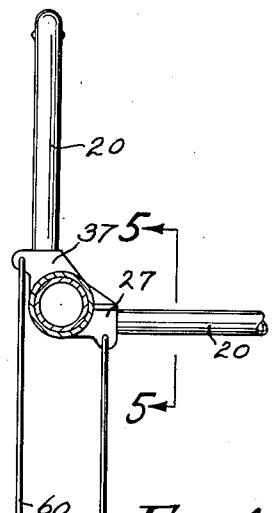
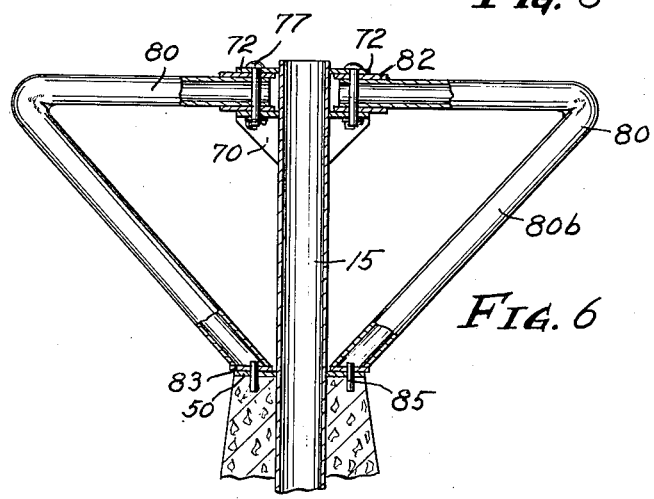
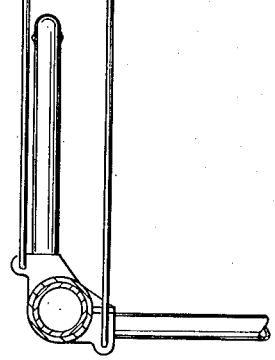
Inventor
Benjamin F. Fitch,
By Bates, Golrick & Hearn
Attorneys Patented Feb. 2, 1937

2,069,235

UNITED STATES PATENT OFFICE 2,069,235

APPARATUS FOR SUPPORTING DEMOUNTABLE BODIES

Benjamin F. Fitch, Greenwich, Conn., assignor to Motor Terminals Company, New York, N. Y., a corporation of Delaware Application May 24, 1934, Serial No. 727,321

6 Claims. (Cl. 248—1)

This invention is concerned with the transportation of freight by means of demountable vehicle bodies which may be transported by highway truck, railway car or vessel. The invention is particularly concerned with an apparatus for supporting such demountable vehicle bodies during intervals when they are removed from the motor trucks, or other means of transportation by which they are carried from place to place. A demountable body of standard form is provided with hooks whereby a crane may carry it from one transporting vehicle to another, or, if desired, the crane may deposit such a demountable body in a storage space within or adjacent the depot until such time as it becomes desirable to transport the body to another location.

Frequently in the past such bodies would arrive at a freight depot and be there retained for appreciable intervals of time, to await the receiving vehicle for the body, or where the consignee of the freight did not promptly call for such goods. Sometimes after the containers had been emptied they were kept at the terminal until such time as they were reloaded for transportation to another point.

Heretofore it has been common practice to remove such a demountable body from a vehicle and transport it to a place within the freight depot where it could be stored until such time as it was again needed. Storage space for such demountable bodies was often provided by merely using a crane to raise the body clear of the vehicle, withdrawing the vehicle from beneath the suspended body, and then lowering the body onto wooden "horses" or other supports placed in the region previously occupied by the vehicle.

This latter provision for storing bodies was not satisfactory because it necessitated the use of "horses" or other unattached supports that could be easily overturned or otherwise positioned, were not always available, or were in the way when present. Nor was it satisfactory to deposit the bodies directly on the ground or depot floor, as such placement required an unnecessary lifting operation if the bodies were to be mounted on other vehicles, and an inconvenient unloading operation if they were to be unloaded when deposited.

An object of my invention has been to overcome the various disadvantages with prior forms of support, as set forth above. A further object of my invention has been to provide removable supports for a demountable body, with means for controlling the position of these supports without the necessity for a workman passing beneath the suspended body.

It has also been an object of my invention to provide vehicle supports that may be active or inactive, as desired, without liability to displacement.

Still another object has been to provide supports of such characteristics that if they are actively positioned to support a demountable body, they may be rendered inactive automatically consequent upon the abutment of a vehicle with them.

My invention is adapted to be used in a freight depot having a series of entries for vehicles carrying demountable bodies with an overhead crane adapted to be moved to stand over any one of such entries. Between each pair of entries I locate centrally supporting columns adapted to carry swingable brackets, which may be moved into position to support a body in one of the entries. The brackets on such supporting columns located to serve one side of an entry, are connected together to swing as a unit; in one position, being located to support thereon a demountable vehicle body, and in another position rendered inactive to allow a vehicle to pass into the entry, the two opposite sides of each entry being provided with such swingable supporting apparatus.

Other features of my invention will become apparent from the specification and accompanying drawing. The essential novel features are summarized in the claims.

Figure 2:
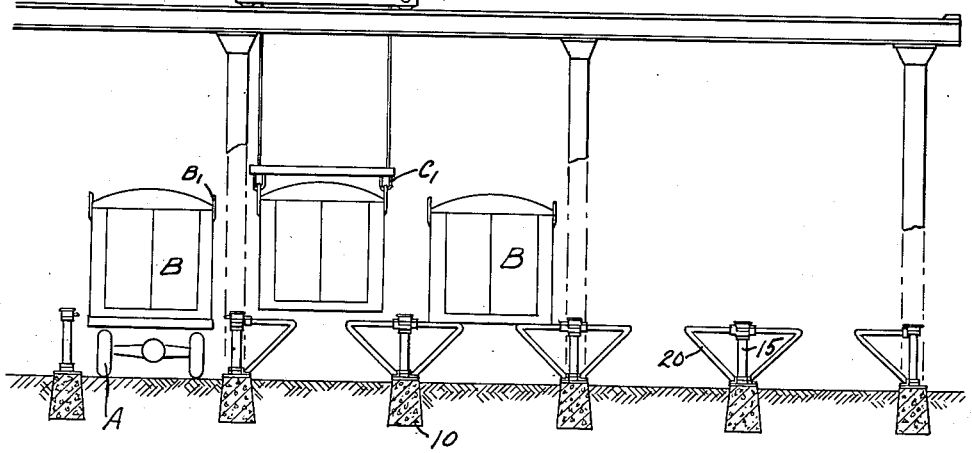

Referring now to the drawings, Fig. 1 is a plan of a freight depot employing my improved demountable body support; Fig. 2 is a side elevation of a freight depot showing the body supporting apparatus of my invention both in an active and in an inactive position; Fig. 3 is a sectional view of a preferred form of my device showing a supporting stanchion with accompanying brackets; Fig. 4 is a horizontal section showing a preferred structural arrangement on one side of an entry way; Fig. 5 is a fragmentary side section through one of the upper bracket parts, as indicated by the line 5—5 of Fig. 4; Fig. 6 is a section similar to Fig. 3, but showing a modified form of my invention; Fig. 7 is a plan of the modified form shown in Fig. 6.

Although I have disclosed my invention as incorporated with an automobile trucking station, it is to be understood that my apparatus may be used with any form of conveyance used in conjunction with demountable bodies.

In general, my demountable body support may be used in conjunction with the freight terminal shown in Fig. 2. A series of parallel entry ways are provided for the admittance of suitable trucks A, which may carry demountable bodies B. An overhead traveling crane C positioned to serve all the entry ways of the depot, carries suitable depending shackles C—1, adapted to engage body lift hooks B—1 on the demountable bodies, in order that the crane may lift them from the truck or other conveyance.

For flexibility in transfer of bodies, it is desirable that the crane C be a sufficient height from the platform to permit it to raise a body high enough to carry it over a second body deposited on either a truck A or the supports which are the subject of this invention.

To provide firm foundations for the equipment used to support demountable bodies, concrete pillars 10 are mounted in the floor of the depot along the line separating adjacent entries. Two of these pillars 10 are provided along the dividing lines between adjacent entry ways.

To practice my invention more successfully, it is desirable that pipe-like supports be provided to carry the various swingable portions of my supporting apparatus. To this end, I have firmly embedded in each concrete base 10 a suitable supporting pipe or stanchion 15. It is apparent that if one does not desire to use the hollow pipe 15, as shown in Figs. 3 and 6, any other suitable form of supporting post may be supplied.

An object of my invention has been to provide supporting brackets for bodies, so mounted that the brackets may be swung into active engagement with a demountable body or to an inactive position, as desired by the operator. As shown, pipe of suitable strength is bent into the V-shape shown in Figs. 3 and 6 to form supporting brackets 20. It will be noted that the top portion 20a of the V-bracket is horizontal to provide a flat framework for the support of a body deposited thereon. In order that the stresses set up in the apparatus, due to the weight of the body and its contents, may be transmitted effectively to the rigid concrete base 10, the lower portion 20b of the V-bracket is set at an acute angle to the horizontal as shown in the drawings.

The brackets 20 are so mounted on a stanchion 15 that each may be partially rotated thereabout without movement of the other. In the preferred form, shown in Fig. 3, suitable collars 21 and 22 embrace the stanchion 15 adjacent its top and are pinned thereto by suitable pins 24. Bearing on the upper collar 22 is a cap-like member 25 acting as a closure for the hollow stanchion stem by reason of its flat top 26. This member 25, whose interior shape is circular to conform to the shape of the stanchion 15, has a suitable recess 27 extending horizontally therefrom. The horizontal end of the V-bracket 20 is fitted into this recess and rigidly secured therein by welding or other suitable means.

A second supporting bracket 20 is provided on the opposite side of the stanchion 15 from that side occupied by the bracket carried in member 25. A second bracket carrying collar 35 also embraces the stanchion 15, but bears against the upper shoulder of a collar 21, pinned to the stanchion 15. The embracing collar 35 has a recess 37 similar to recess 27 adapted to receive the horizontal end of the bracket 20, as shown in the left-hand side of Fig. 3. The recesses 27 and 37 of the embracing collars 25 and 35 are so located that the axes of the horizontal portion of the oppositely located brackets 20 lie in the same horizontal plane.

To provide for supporting the lower legs of the brackets 20, collars 40 and 45 have been rotatively fitted to the lower portion of the stanchion 15 adjacent the point where it enters the concrete block 10. Fastened to the upper collar 40 is a flange 42 having a horizontal portion 43 adapted to rest on a plate 50 of the pillar 10. The left-hand bracket 20 has its angular tubular portion 20b welded or otherwise fastened to the horizontal portion 43 of the flange 42. The portion 20b of the right-hand bracket 20 is fastened to the collar 45. This collar 45 has welded thereto a flange 47 with a horizontal face 48, which in turn has welded thereto the end of the angular portion 20b of the right-hand V-bracket 20, as shown in Fig. 3. The horizontal portion 48 of this flange bears against the plate 50 covering the top of the concrete block 10.

It will now be apparent that each of the two brackets 20, mounted on the stanchion 15, is supported adjacent the top of the stanchion by collars fastened thereto which rotatably embrace the stanchion 15. These brackets are also rotatably or swingably held in position by their respective flanges and collars which bear against the plate 50 and the sides of the stanchion 15, adjacent its lower portion. If desired stops may be provided to limit the swingable movement of brackets 20 as desired.

In my preferred form, I choose to mount two stanchions along the line dividing each pair of adjacent entry ways, and thus provide on each side of an entry way a pair of outwardly extending brackets 20 for the support of a body deposited within that entry way. It is apparent that if desirable more or less stanchions and brackets might be used than I find preferable.

In order that the plurality of brackets 20 used at one side of each entry way may operate as a unit, I provide a link 60 suitably fastened to the brackets serving one side of an entry. As shown in Fig. 5, the ends of the link 60 may merely be turned at right angles to the major portion and depend through suitable holes in the bracket member 25 or 35. Suitable fastening means may retain the link 60 in position on the aforementioned brackets.

Brackets 20 are shown in active position in Fig. 4 on the right-hand side of the center line and in an inactive position on the left-hand side. It is possible to automatically render the brackets 20 inactive, upon the placement of a truck in the entry way served by them, by merely driving the truck into the entry way. As the bolster or some other part of the truck strikes the first bracket 20, the bracket is rotated about the stanchion 15 until the inactive position has been assumed. Link 60, connected to the other bracket, causes this latter to move simultaneously in a similar manner, and thus when the first bracket has been rendered inactive the latter has also.

If desired, stops may be provided to prevent the brackets moving into inactive position by rotating about the stanchions other than in one direction. Having rendered the supporting brackets inactive, a workman may easily position them for use by rotating one out into the entry way, when the connecting link will cause the other to also assume an active position. It should be noted that I have so located my brackets that in an inactive position, they lie as nearly behind the stanchions as possible.

A modified form of construction is shown in Figs. 6 and 7. In this case a coupling 70 is suitably fastened as by welding adjacent the top of the stanchion 15. Projecting horizontally from the coupling on opposite sides of the stanchion are recesses 72 for the reception of the horizontal legs of the brackets 80. The ends of these legs are mounted in suitable members 82, which in turn are shaped to be swingable horizontally within the recesses 72. A pin 77 carried by the coupling passes across the recess and through the respective member 82 on the end of the bracket 80 to provide a vertical axis whereby the bracket may swing horizontally with respect to the stanchion. A cotter pin on the under side of the pin 77 retains it in position.

Means are provided adjacent the face of the foundation block 10 to further swingably support the brackets 80. A plate 50, of similar construction to that of Fig. 3, is mounted on the top of the concrete foundation 10. The angular portions 80b of the brackets 80, as shown in Fig. 6, have horizontal bearing plates, 83 fastened on the ends thereof by welding or other suitable means. Studs 85 are fixed in the concrete foundation 10 and are adapted to pass through holes in the members 83 and the wearing plates 50 in such a position that they lie along the axis of the bolt 77 adjacent the upper portion of the stanchions 15.

It will be seen that the oppositely located brackets 80 in my modified construction of Fig. 6, are mounted with respect to the stanchions 15 in such manner that they may be swung into an active or an inactive position in a manner similar to that possible with the construction of Fig. 3. Cooperating brackets on adjoining stanchions may be connected by link rods 60, as shown in Fig. 7, to provide simultaneous movement of cooperating brackets.

It is understood that further modifications of my apparatus may be effected without departing from the spirit of my invention. One such modification involves the use of swinging brackets to support only one end of my body and a fixed support to carry the other end. For instance, I may employ one pair of swinging brackets respectively on opposite sides of a truck stall adjacent the entrance thereto and a suitable fixed support at the rear end of the stall, which might, if desired, act as a bumper to coact with the rear bolster of the truck. Then after the body is elevated from the truck and the truck driven out and the pair of brackets positioned, the body may be directly lowered onto the projection and positioned brackets.

With such construction as just mentioned, it is not necessary to use more than one pair of brackets and thus the link rod 60 may be eliminated, and such apparatus may be rendered inactive by merely swinging the brackets 20 or 80 out of the entry. If desired, such an inactive position may result from abutment of the vehicle with the swinging brackets as the former enters the stall.

It will be apparent from the preceding description that I have provided an effective means for supporting demountable bodies within conveyance entry ways, and further, that I have provided support for such bodies, so built that by merely causing a conveyance to enter an entry way the apparatus becomes inactive and does not interfere with the occupancy of the entry by the conveyance. My invention further provides means for supporting bodies at the same level as that required of a platform used to unload the bodies when they remain on the conveyance. By fixedly mounting the various parts of my supporting apparatus, there is no time lost through hunting misplaced parts; and danger to workmen is eliminated by avoiding the necessity for passing under the body to position horses or other supporting means.

Having described my invention, what I claim is:

1. In supporting apparatus of the class described, a base, an upright post fixed thereon, two shoulders adjacent the top of said post one above the other, two collars embracing said post and each bearing on a respective shoulder, two V-brackets, one end of each V-bracket being fixed to a respective collar, a second pair of collars to which the other end of said V-brackets is respectively fixed, and means on each of said second collars positioned to bear directly against said base.

2. In a supporting apparatus of the class described, a base having a flat top portion, a pipe member fixed on said base, a pair of brackets spaced apart and carried adjacent the top of said pipe portion, a wear plate on the top of said base, a tubular V-bracket with one end carried horizontally between said top plates and the other end of said bracket resting on said base plate, pivoted eccentrically of said pipe axis and swingable about a vertical axis.

3. In a supporting apparatus of the class described, a base, a pipe portion mounted upright thereon, a wear plate on top of said base, a pair of plates carried at the top of said pipe portion and spaced apart, two V-bracket members with their upper ends inserted between and pivotally secured to said plates, eccentrically of said pipe axis, the lower portions of said brackets being pivotally secured to and resting on said wear plate, and said brackets being swingable about an axis parallel to said pipe.

4. A supporting apparatus of the class described, a flat base, a wear plate on top of said base, an upright post secured in said base and extending thereabove, two annular shoulders at the top of said post and spaced apart, a pair of bracket members each having a cylindrical opening to encircle said post and each having a tubular socket at right angles to said opening, V-bracket members having their ends secured in respective sockets and extending outwardly at right angles to said post, the lower portions of said brackets being secured to collars encircling the lower portions of said post and adapted to bear against said wear plate.

5. A supporting apparatus for a body comprising a base having a flat top, a post secured in said base, a pair of annular shoulders secured to the upper portion of said base and spaced apart, one below the other, a member having two tubular openings at right angles to each other, one adapted to fit over said post and bear upon the upper of said shoulders, and a cover for the top of said post, said other opening extending at right angles to said post when in mounted position, a V-bracket having one arm secured in said second opening and the other arm bearing against said flat base and pivotally secured to said post adjacent said base, a second member comprising an annular ring adapted to encircle said post and rest on the lowermost of said shoulders and below the upper shoulder, a tubular opening carried by said second member and adapted to extend at right angles to said post and in the same horizontal plane as the similar opening of said first member, a V-bracket having one end engaging the socket of said second member, the other end adapted to bear against said flat base and pivotally secured to the lower portion of said post adjacent said base.

6. In load handling apparatus of the class described the combination of four fixed and rigid upright columns in quadrilateral arrangement defining an entryway for a truck adapted to carry a demountable body, brackets respectively pivoted at vertically spaced regions on each column, each bracket being swingable horizontally toward the center of the entryway into a position in which it will underlie a demountable body in substantially the position in which it is supported on such truck in the entryway and into another position in which the bracket is entirely out of vertical alignment with the body and entirely out of the way of the truck in passing into and out of the entryway, and means operatively connecting the brackets on respective sides of the entryway whereby the movement of one bracket to the desired position similarly positions the other.

BENJAMIN F. FITCH.